United States Patent
Ng et al.

(10) Patent No.: US 7,672,742 B2
(45) Date of Patent: Mar. 2, 2010

(54) METHOD AND SYSTEM FOR REDUCING AUDIO LATENCY

(75) Inventors: Buay Hock Ng, Singapore (SG); Jianyun Zhou, Singapore (SG); ShunNian Zhai, Singapore (SG)

(73) Assignee: Adaptec, Inc., Milpitas, CA (US)

( * ) Notice: Subject to any disclaimer, the term of this patent is extended or adjusted under 35 U.S.C. 154(b) by 842 days.

(21) Appl. No.: 11/059,972

(22) Filed: Feb. 16, 2005

(65) Prior Publication Data

US 2006/0184261 A1  Aug. 17, 2006

(51) Int. Cl.
  *G06F 17/00* (2006.01)
(52) U.S. Cl. ...................... 700/94; 369/30.23
(58) Field of Classification Search ............ 710/20, 710/54; 700/94
  See application file for complete search history.

(56) References Cited

U.S. PATENT DOCUMENTS

| | | | | |
|---|---|---|---|---|
| 5,262,875 A * | 11/1993 | Mincer et al. | | 386/101 |
| 5,404,446 A * | 4/1995 | Bowater et al. | | 345/537 |
| 5,768,126 A * | 6/1998 | Frederick | | 700/94 |
| 5,854,887 A * | 12/1998 | Kindell et al. | | 725/86 |
| 5,949,410 A * | 9/1999 | Fung | | 715/203 |
| 5,978,762 A * | 11/1999 | Smyth et al. | | 704/229 |
| 6,163,647 A * | 12/2000 | Terashima et al. | | 386/96 |
| 6,202,164 B1 * | 3/2001 | Gulick | | 713/400 |
| 6,338,038 B1 * | 1/2002 | Hanson | | 704/500 |
| 6,487,535 B1 * | 11/2002 | Smyth et al. | | 704/500 |
| 6,704,281 B1 * | 3/2004 | Hourunranta et al. | | 370/230 |
| 6,977,897 B1 * | 12/2005 | Nelson et al. | | 370/235 |
| 7,039,477 B1 * | 5/2006 | Kamiya et al. | | 700/94 |
| 7,069,223 B1 * | 6/2006 | Matsumoto et al. | | 704/500 |
| 7,281,053 B2 * | 10/2007 | Mantegna et al. | | 709/231 |
| 7,302,396 B1 * | 11/2007 | Cooke | | 704/500 |
| 7,434,078 B2 * | 10/2008 | Swenson et al. | | 713/400 |
| 7,475,121 B2 * | 1/2009 | Ushigusa | | 709/217 |
| 2002/0004840 A1 * | 1/2002 | Harumoto et al. | | 709/231 |
| 2002/0150126 A1 * | 10/2002 | Kovacevic | | 370/503 |
| 2003/0112758 A1 * | 6/2003 | Pang et al. | | 370/235 |
| 2003/0123540 A1 * | 7/2003 | Zhong et al. | | 375/240.07 |
| 2003/0140159 A1 * | 7/2003 | Campbell et al. | | 709/231 |
| 2003/0206558 A1 * | 11/2003 | Parkkinen et al. | | 370/477 |
| 2004/0064576 A1 * | 4/2004 | Goldhor et al. | | 709/232 |
| 2005/0060753 A1 * | 3/2005 | Lundblad et al. | | 725/100 |
| 2005/0157828 A1 * | 7/2005 | Midya et al. | | 375/372 |
| 2005/0234571 A1 * | 10/2005 | Holmes | | 700/94 |
| 2006/0039280 A1 * | 2/2006 | Anandakumar et al. | | 370/229 |
| 2006/0045138 A1 * | 3/2006 | Black et al. | | 370/516 |
| 2006/0093331 A1 * | 5/2006 | Huang et al. | | 386/96 |
| 2006/0095943 A1 * | 5/2006 | Demircin et al. | | 725/81 |
| 2006/0109789 A1 * | 5/2006 | Skerritt | | 370/238 |
| 2006/0149850 A1 * | 7/2006 | Bowman | | 709/231 |
| 2006/0271982 A1 * | 11/2006 | Gallou et al. | | 725/100 |
| 2007/0008984 A1 * | 1/2007 | Philips et al. | | 370/412 |
| 2007/0177620 A1 * | 8/2007 | Ohmuro et al. | | 370/412 |

* cited by examiner

*Primary Examiner*—Curtis Kuntz
*Assistant Examiner*—Paul McCord
(74) *Attorney, Agent, or Firm*—Martine Penilla & Gencarella LLP (57) ABSTRACT

A method for reducing audio latency when executing program instructions for processing audio data is provided. In this method, a top threshold value and a bottom threshold value are provided. A determination is then made as to the amount of audio data stored in an audio buffer of an audio renderer. Thereafter, the amount is compared with the top threshold value and the bottom threshold value, and accordingly, an audio data feed to the audio renderer is adjusted incrementally such that the amount is between the top threshold value and the bottom threshold value.

14 Claims, 5 Drawing Sheets

METHOD AND SYSTEM FOR REDUCING AUDIO LATENCY

BACKGROUND OF THE INVENTION

1. Field of the Invention

This invention relates generally to audio processing and, more particularly, to method and system for reducing audio latency.

2. Description of the Related Art

A computer can be configured to capture audio/video outputted from a wide variety of sources, such as camcorders, televisions, video cassette recorders, etc. When previewing a real-time audio/video from a source on a computer, a user will typically experience audio latency whereby the audio and video are not synchronized. In other words, the audio may lag behind or lead the video by a few seconds.

Audio latency may be caused by the use of different clock frequencies by a video/audio capture device and by the computer. In particular, a first frequency used within the video/audio capture device is typically different from a second frequency of audio capture clock at which an audio renderer within the computer sends audio data to an audio encoder. For instance, if the first frequency is greater than the second frequency, then rendering is slower than capturing, which results in an increase in audio latency. On the other hand, if the first frequency is lesser than the second frequency then rendering is faster than capturing, which results in audio gaps that manifests as audio clicks.

As a result, there is a need to provide method and system for reducing audio latency to synchronize audio with video.

SUMMARY OF THE INVENTION

Broadly speaking, the present invention fills these needs by providing method and system for reducing audio latency. It should be appreciated that the present invention can be implemented in numerous ways, including as a method, a system, or a device. Several inventive embodiments of the present invention are described below.

In accordance with a first aspect of the present invention, a method for reducing audio latency when executing program instructions for processing audio data is provided. In this method, a top threshold value and a bottom threshold value are provided. A determination is then made as to the amount of audio data stored in an audio buffer of an audio renderer. Thereafter, the amount is compared with the top threshold value and the bottom threshold value, and accordingly, an audio data feed to the audio renderer is adjusted incrementally such that the amount is between the top threshold value and the bottom threshold value.

In accordance with a second aspect of the present invention, a computer readable medium having program instructions for reducing audio latency when executing program instructions for processing audio data is provided. The computer readable medium includes program instructions for providing a top threshold value and a bottom threshold value. Additionally included are program instructions for determining an amount of the audio data stored in an audio buffer of an audio renderer and program instructions for comparing the amount with the top threshold value and the bottom threshold value. Furthermore, the computer readable medium includes program instructions for decreasing the audio data feed from a streaming driver to the audio renderer by an incremental amount if the amount is greater than the top threshold value, and program instructions for increasing the audio data feed from the streaming driver to the audio renderer by the incremental amount if the amount is less than the bottom threshold value.

In accordance with a third aspect of the present invention, a computer system for reducing audio latency when executing program instructions for processing audio data is provided. The computer system includes a memory configured to store a streaming driver program and a processor configured to execute the streaming driver program stored in the memory. The streaming driver program includes program instructions for determining an amount of the audio data stored in an audio buffer of an audio renderer and program instructions for comparing the amount with a top threshold value and a bottom threshold value. Additionally included are program instructions for decreasing the audio data feed to the audio renderer such that the decreased audio data feed is slower than a rendering of the audio data by the audio renderer if the amount is greater than the top threshold value, and program instructions for increasing the audio data feed to the audio renderer such that the increased audio data feed is faster than the rendering of the audio data by the audio renderer if the amount is less than the bottom threshold value.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for hardware implemented method and system for reducing audio latency. It will be obvious, however, to one skilled in the art, that the present invention may be practiced without some or all of these specific details. In other instances, well known process operations have not been described in detail in order not to unnecessarily obscure the present invention.

The embodiments described herein provide method and system for reducing audio latency when executing program instructions for processing audio data. In one embodiment, an amount of audio data stored in an audio buffer is determined, and the amount is compared with a top threshold value and a bottom threshold value. As will be explained in more detail below, an audio data feed to an audio renderer is adjusted incrementally such that the amount is between the top threshold value and the bottom threshold value. By keeping the amount of audio data stored in the audio buffer within the top threshold value and the bottom threshold value, audio latency is reduced or altogether eliminated.

Figure 1:
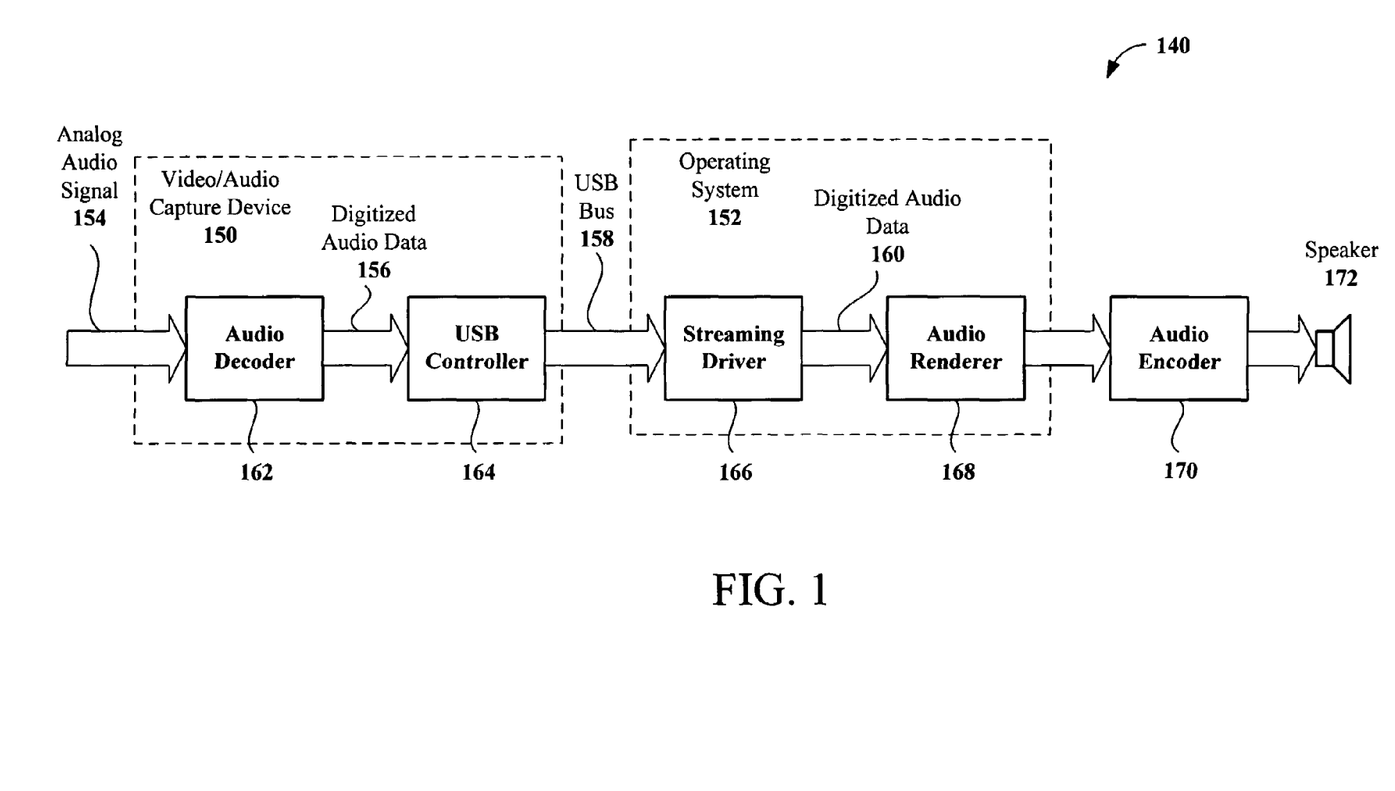
FIG. 1 is a simplified block diagram of a system for rendering analog audio signals, in accordance with one embodiment of the present invention.

FIG. 1 is a simplified block diagram of a system for rendering analog audio signals, in accordance with one embodiment of the present invention. As shown in FIG. 1, system 140 includes operating system 152, video/audio capture device 150, audio encoder 170, and speaker 172. Operating system 152 is in communication with video/audio capture device 150 and audio encoder 170. Operating system 152 is the system software responsible for the control and management of hardware and basic system operations, as well as running application software. Exemplary operating system 152 includes Microsoft Windows, Microsoft-DOS, UNIX, Linux, Macintosh Operating System, etc. Included within operating system 152 are streaming driver 166 and audio renderer 168. It should be appreciated that streaming driver 166 may include any suitable driver that supports the processing of streamed data for multimedia devices such as sound cards, TV tuner cards, video graphics cards, etc. Audio renderer 168 includes any suitable renderer that renders audio data. An exemplary audio renderer 168 is the Microsoft DirectSound Audio Renderer that filters and renders audio data.

System 140 may additionally include video/audio capture device 150 that is an apparatus for converting analog audio/video output from a source (e.g., video game consoles, camcorders, televisions, video cassette recorders, etc.) to a digital format for real-time streaming to a computer system. Video/audio capture device 150 may be used to connect the source to the computer system through Universal Serial Bus (USB) such that video and audio from the source may be viewed, listened, and captured on the computer system. It should be appreciated that video/audio capture device 150 is merely an example of one type of connection between a source and computer system. Other types of connections may include audio cables that connect the source to a sound card of the computer system, video cables that connect the source to a video card of the computer system, etc. System 140 additionally includes audio encoder 170 which converts digital audio data to analog audio data and renders the analog audio data to speaker 172.

As shown in FIG. 1, audio decoder 162 receives analog audio signal 154 and converts the analog audio signal to digitized audio data 156 at an audio capture clock frequency (e.g., 48 KHz, 48.05 KHz, etc.) for output to USB controller 164. USB controller 164 receives digitized audio data 156 and transfers the streaming, digitized audio data to streaming driver 166 of operating system 152 via USB bus 158. Subsequently, streaming driver 166 processes the audio data and outputs digitized audio data 160 to audio renderer 168 for rendering. As a result, audio renderer 168 sends a buffered, digital audio data to audio encoder 170 at an audio rendering clock frequency (e.g., 48.00 KHz). Audio encoder 170 then converts the digital audio data to analog audio data for rendering on speaker 172.

Figure 2:
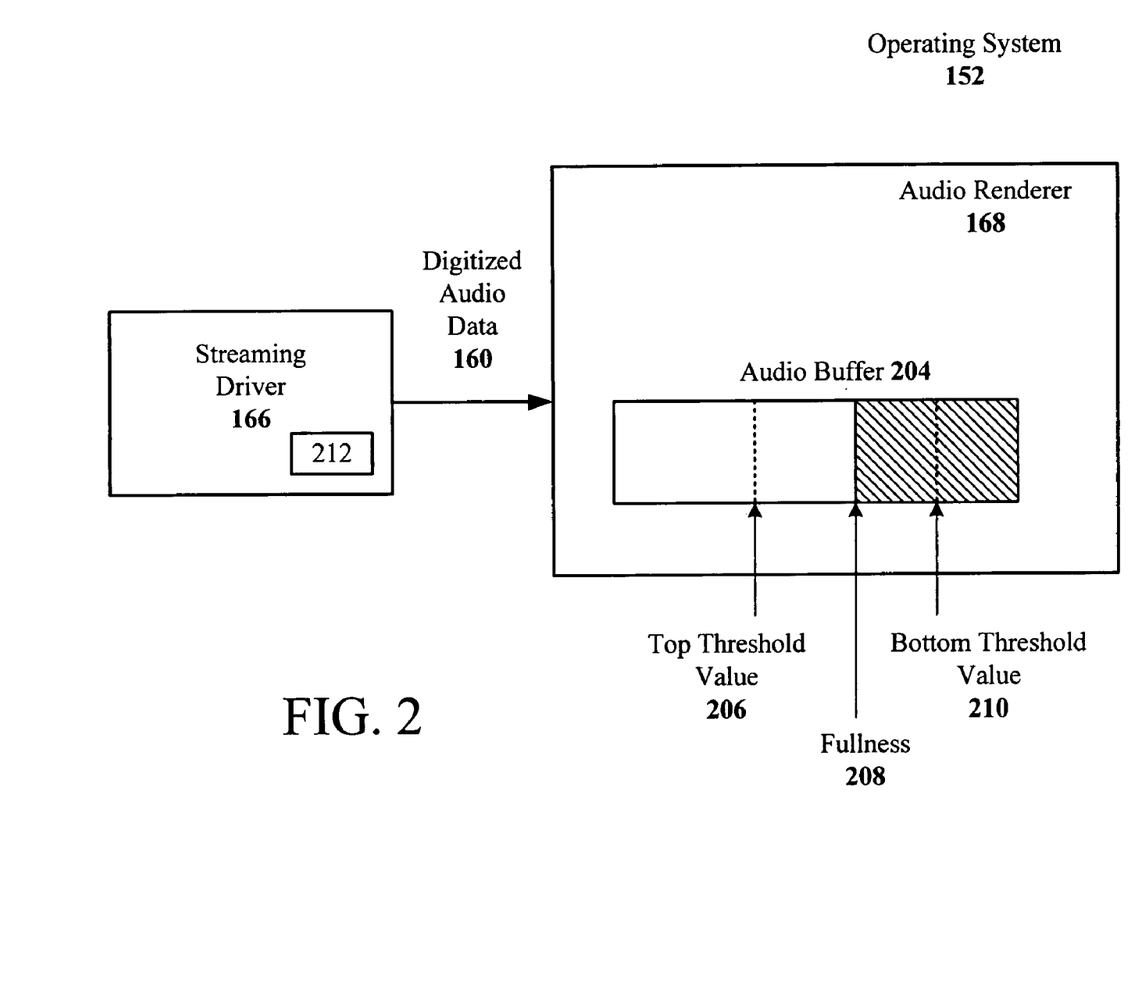
FIG. 2 is a more detailed block diagram of the operating system shown in FIG. 1, in accordance with one embodiment of the present invention.

FIG. 2 is a more detailed block diagram of the operating system shown in FIG. 1, in accordance with one embodiment of the present invention. As shown in FIG. 2, operating system 152 includes streaming driver 166 and audio renderer 168. After streaming driver 166 passes digitized audio data 160 to audio renderer 168, the audio renderer temporarily stores the digitized audio data in audio buffer 204 for rendering, which allows the audio renderer and an audio encoder that process the audio data at different speeds to operate without being delayed by one another.

With reference to audio buffer 204, FIG. 2 additionally shows fullness 208 that indicates the amount of audio data stored in the audio buffer. For example, a large fullness 208 value indicates a large amount of audio data stored in audio buffer 204. It should be noted that the amount of audio data stored in audio buffer 204 has a direct correlation with the delay of audio signal processing. For instance, the larger the fullness 208, the longer the delay of processing the audio signals. Furthermore, as will be explained in more detail below, embodiments of the invention use top threshold value 206 and bottom threshold value 210 for reducing audio latency by adjusting incrementally the audio data feed to audio renderer 168 such that the amount of audio data (i.e., fullness 208) stored in audio buffer 204 is between the top threshold value and the bottom threshold value.

Further, since an embodiment of the invention adjusts the audio data feed to audio renderer 168, embodiments of the invention may be included in streaming driver 166. For example, in one embodiment, streaming driver 166 may additionally include program instructions 212 for adjusting incrementally the audio data feed from the streaming driver to audio renderer 168. Specifically, as will be explained in more detail below, program instructions 212 included in streaming driver 166 may make the adjustments by decreasing or increasing the audio data feed to audio renderer 168 such that fullness 208 is between top threshold value 206 and bottom threshold value 210.

Figure 3:
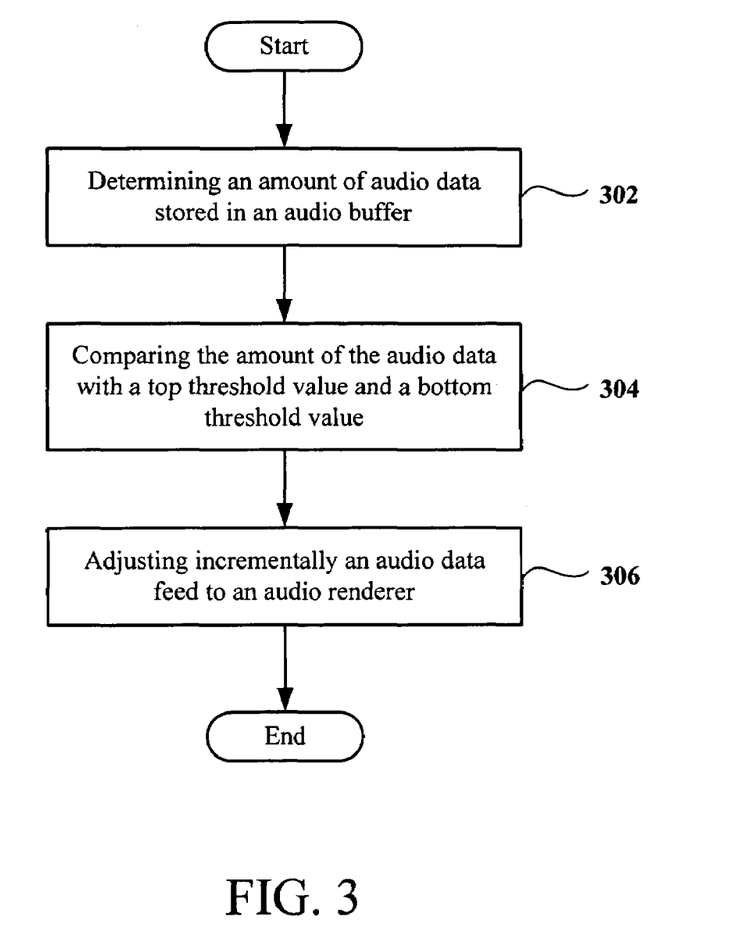
FIG. 3 is a flowchart diagram of a high level overview of a method for reducing audio latency when executing program instructions for processing audio data, in accordance with one embodiment of the present invention.

FIG. 3 is a flowchart diagram of a high level overview of a method for reducing audio latency when executing program instructions for processing audio data, in accordance with one embodiment of the present invention. Starting in operation 302, an amount of audio data stored in an audio buffer is first determined. Thereafter, in operation 304, the amount of audio data stored in the audio buffer is compared with a top threshold value and a bottom threshold value. The audio data feed is then adjusted incrementally in operation 306 such that the amount of stored audio data is between the top threshold value and the bottom threshold value.

Figure 4:
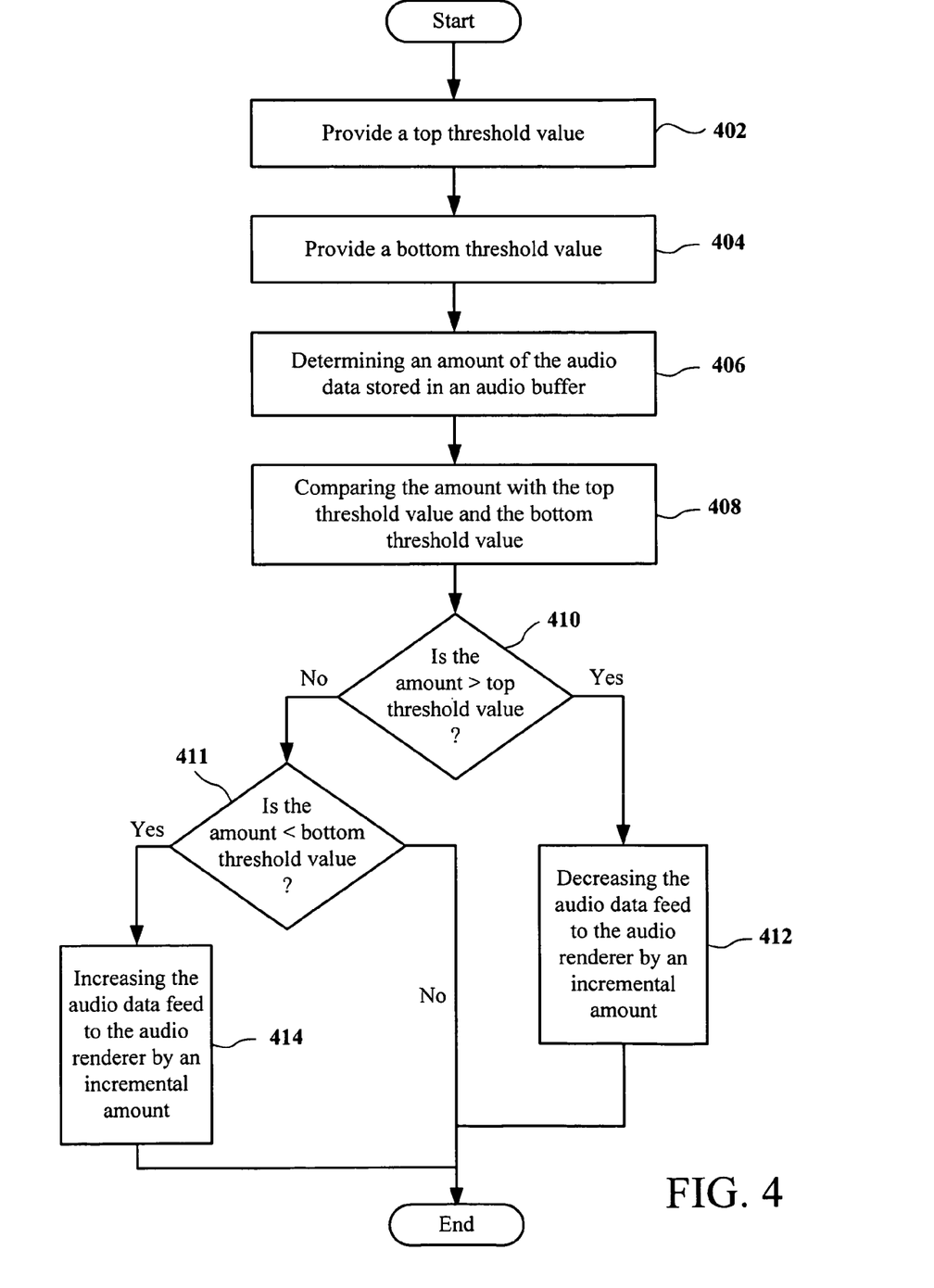
FIG. 4 is a flowchart diagram of a more detailed method for reducing audio latency when executing program instructions for processing audio data, in accordance with one embodiment of the present invention.

FIG. 4 is a flowchart diagram of a more detailed method for reducing audio latency when executing program instructions for processing audio data, in accordance with one embodiment of the present invention. Starting with operations 402 and 404, a top threshold value and a bottom threshold value are provided. Top threshold value may include any suitable value, and bottom threshold value may include any suitable value that is less than the top threshold value. In one exemplary embodiment, top threshold value may be calculated by:

$$\text{Top\_thershold} = \text{freq\_audio}\left(\frac{\text{Max\_delay\_time}}{1000}\right) \qquad (1.0)$$

With regard to Equation (1.0), maximum delay time (i.e., max_delay_time) is a time limit used by embodiments of the invention to assure that audio latency will be within the maximum delay time during rendering by audio renderer. An exemplary maximum delay time is 50 ms. Freq_audio is the standard audio frequency, which may be different from audio capture clock frequency and audio capture clock frequency as discussed above. Exemplary standard audio frequencies include 48 KHz, 44.1 KHz, 32 KHz, etc. Accordingly, in one embodiment, a top threshold value may be calculated if the maximum delay time and the standard audio frequency are provided. For example, assuming maximum delay time=50 ms and standard audio frequency=48 KHz, then top threshold is (50 ms/1000)*48000, which equals 2400 samples.

Bottom threshold value may include any suitable value that is less than top threshold value. In one embodiment, bottom threshold value may be derived from top threshold value. For instance, bottom threshold value may be calculated by:

$$\text{Bottom\_threshold} = \frac{\text{Top\_threshold}}{3} \qquad (1.1)$$

Accordingly, with reference to the top threshold value of 2400 samples discussed above, the bottom threshold value is simply 2400 samples/3, which equals 800 samples.

Still referring to FIG. 4, the amount of audio data stored in the audio buffer is then determined in operation 406. The amount of audio data may be determined by receiving the fullness value directly from audio renderer. Thereafter, the amount of audio data is compared with the top threshold value and the bottom threshold value in operation 408. As shown in operation 410, the top threshold value is compared with the amount of audio data stored in the audio buffer to determine whether the stored amount is greater than the top threshold value. If the amount of data stored in audio buffer is greater than top threshold value, then the audio data feed from a streaming driver is decreased by an incremental amount in operation 412. Specifically, the streaming driver first receives a sample of the audio data and reduces the sample of the received audio data by the incremental amount through interpolation. It should be appreciated that any suitable interpolation techniques may be applied. Exemplary interpolation techniques include linear interpolation and non-linear interpolation. Additionally, interpolation may simply include taking the floor or ceiling of the audio data.

Subsequently, the streaming driver outputs the reduced sample of audio data to the audio renderer. For example, if the incremental amount is specified as two audio data samples in each 1000 samples, then for every 1000 samples received by streaming driver, streaming driver reduces two samples from the 1000 received samples, and interpolates the 1000 received samples to generate 998 samples. Streaming driver then outputs the 998 samples of audio data to the audio renderer. If the amount of audio data stored in the audio buffer is still greater than the top threshold value after the interpolation, then the audio data is still fed to the audio renderer faster than the speed at which the audio renderer can render the audio data. Accordingly, the streaming driver will further reduce the number of audio data samples to 996. The reduction will repeat for subsequent samples of the audio data until the amount of audio data buffered in audio renderer is less than or equal to the top threshold value.

On the other hand, as shown in FIG. 4, if the amount of audio data stored in audio buffer is not greater than top threshold value, then another comparison may be conducted in operation 411 to determine whether the amount of audio data is less than the bottom threshold value. If the amount of audio data is not less than the bottom threshold value, then the amount of audio data is between the top threshold value and the bottom threshold value, and no further adjustments are necessary. However, if the amount of audio data is less than the bottom threshold value, then the audio data feed from the streaming driver is increased by an incremental amount in operation 414. Specifically, the streaming driver first receives a sample of the audio data and increases the sample of the audio data by the incremental amount through interpolation.

Subsequently, the streaming driver outputs the increased sample of the audio data to the audio renderer. For example, if the incremental amount is again specified as two audio data samples in each 1000 samples, then for every 1000 samples received by streaming driver, the streaming driver adds two samples to the 1000 received samples through interpolation to generate 1002 samples. Streaming driver then outputs the 1002 samples of audio data to the audio renderer. If the amount of audio data stored in the audio buffer is still less than the bottom threshold value after the interpolation, then the audio data is still fed to audio renderer slower than the speed at which the audio renderer can render the audio data. Accordingly, the streaming driver will further increase the number of audio data samples to 1004. The increase will repeat for subsequent samples of the audio data until the amount of audio data stored in the audio renderer is greater than or equal to the bottom threshold value.

As discussed above, the incremental amount is the number of samples that is adjusted each time when the amount of audio data stored in audio buffer is either larger than the top threshold value or lesser than the bottom threshold vale. Incremental amount may include any suitable values. For example, in one embodiment, the incremental amount can be calculated by:

$$\text{Incremental\_amount} = \text{orginal\_sample\_size}\left(\frac{\text{Freq\_2}}{\text{Freq\_1}} - 1\right) \qquad (1.2)$$

Referring to Equation (1.2), original sample size is the number of audio samples received by streaming driver. As discussed above, audio rendering clock frequency (i.e., Freq_2) is the frequency at which an audio renderer sends audio data to an audio encoder, and audio capture clock frequency (i.e., Freq_1) is the frequency at which an audio decoder converts the analog audio signal to digitized audio data. For example, assuming that the standard audio frequency (i.e., freq_audio) is 48 KHz and the amount of audio data stored in the audio buffer increases from 0 to 2400 samples (50 ms delay) during 24 seconds, which is about a one second delay in eight minutes ((8*60/24)*50 ms=1000 ms=1 s), then for each second the amount of audio data increases by 100 samples, and Freq_2/Freq_1=(48000+100)/48000=481/480. If original sample size is 481, then incremental amount=481*(481/480−1)=1. Thus, one sample is reduced for every 481 samples and, as a result, the reduced audio data is fed to the audio renderer at the same speed as the audio renderer renders the audio data.

Figure 5:
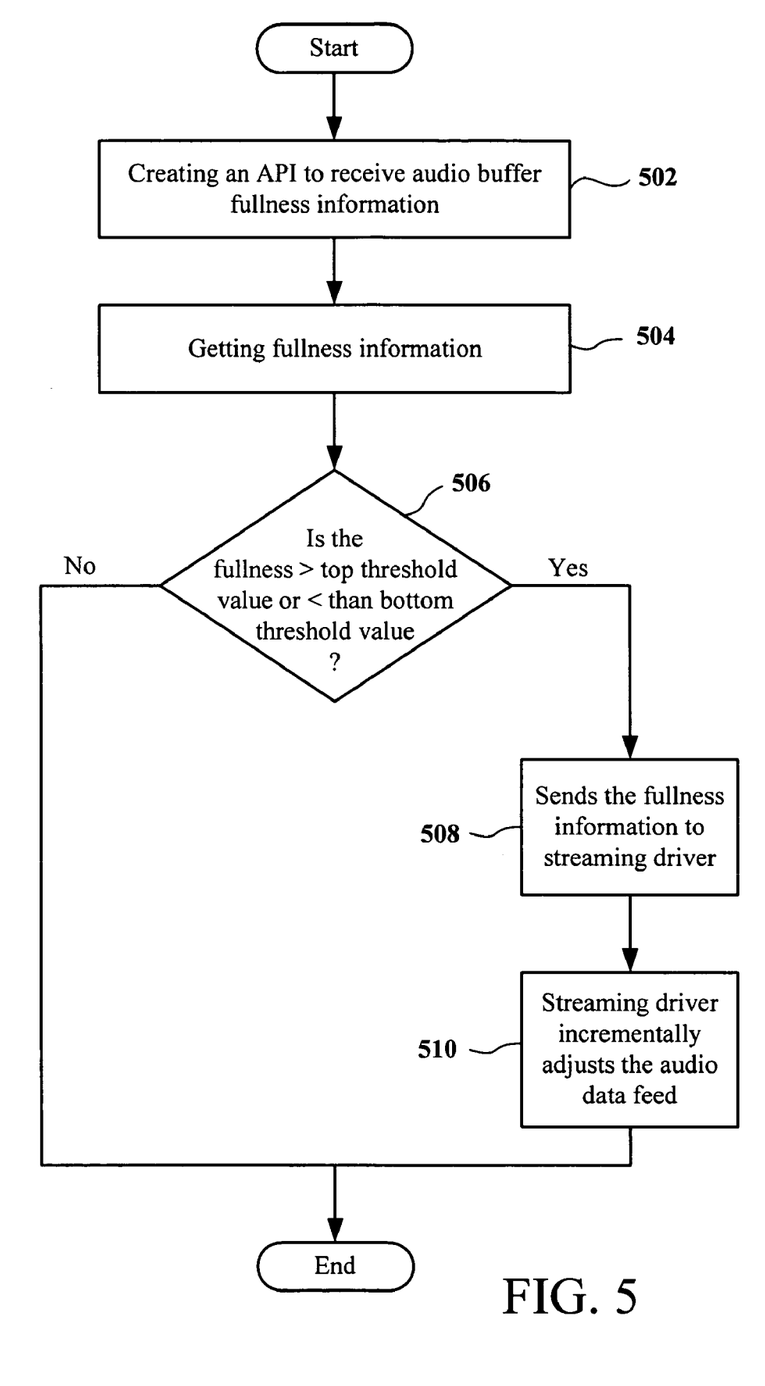
FIG. 5 is a flowchart diagram of a detailed method for implementing an embodiment of the present invention in Microsoft Windows, in accordance with one embodiment of the present invention.

FIG. 5 is a flowchart diagram of a detailed method for implementing an embodiment of the present invention in Microsoft Windows. Starting in operation 502, the streaming driver creates an application program interface (API) to receive audio buffer fullness information from an application that reads the buffer fullness information from the Direct-Sound Audio Renderer. Specifically, to create the API, Microsoft Stream Class minidriver defines the following property set Globally Unique Identifier (GUID) and implements the property set on an IKSPropertySet interface. The property set allows applications to send commands to the driver through the IKSPropertySet interface with GUID PROPSETID_ADAPTEC_PROPERTIES, which is defined as {0x2d2c4cd1, 0xd8c7, 0x45ae, {0xb5, 0x4a, 0xee, 0x7c, 0x66, 0xa, 0x82, 0x54}}. Here, set GUID PROPSETID_ADAPTEC_PROPERTIES implements settings related to specific properties. For example, the following Table A summarizes an exemplary Property ID that may be implemented in a property set and also shows the parameters to be passed to the Set and Get calls.

TABLE A

| Property ID | Command Code | Set/Get | pPropData |
|---|---|---|---|
| ADPT_AUDIO_RENDERER_FULLNESS | 0x01 | set | byte |

As shown in FIG. 5, after the API is created, the API gets the audio buffer fullness information from DirectSound Audio Renderer in operation 504 through an IAMAudioRendererStats::GetStatParam method. Subsequently, operation 506 shows that a comparison is made to determine whether the fullness is greater than a top threshold value or lesser than a bottom threshold value. If the fullness is greater than the top threshold value or lesser than the bottom threshold value, then the application sends the fullness information to streaming driver in operation 508 through the IKSPropertySet interface with property Set GUID (PROPSETID_ADAPTEC_PROPERTIES) and Property Id (ADPT_AUDIO_RENDERER_FULLNESS). Else, if the fullness is between the top threshold value and the bottom threshold value, then the fullness information is not sent to the streaming driver.

FIG. 5 further shows that after operation 508, streaming driver incrementally adjusts the audio data feed in operation 510. As discussed above, the audio data feed to the audio renderer is increased or decreased incrementally through interpolation. In other words, the streaming driver shrinks or expands the audio data feed through interpolation according to whether the fullness is greater than the top threshold value or lesser than the bottom threshold value before passing the audio data to audio renderer. The following Table B is an exemplary embodiment of program instructions for adjusting incrementally the audio data feed to reduce audio latency.

TABLE B

```
#define ORIGINAL_SAMPLE_SIZE    1000
#define ADJUSTED_SIZE           2
#define BOTTOM_THRESHOLD 200
#define TOP_THRESHOLD       400
WORD wOriginalAudioSamples[ORIGINAL_SAMPLE_SIZE];
WORD wAdjustedAudioSamples[ORIGINAL_SAMPLE_SIZE + ADJUSTED_SIZE];
WORD wFullness;
WORD wAdjustedSampleSize = ORIGINAL_SAMPLE_SIZE;
WORD AdjustAudioSamples( )
{
    WORD I, wFloor, wCeiling;
    DOUBLE dDistance;
    if (wFullness > TOP_THRESHOLD)
    {
        wAdjustedSampleSize -= ADJUSTED_SIZE;
    }
    else if (wFullness < BOTTOM_THRESHOLD)
    {
        wAdjustedSampleSize += ADJUSTED_SIZE
    }
    if (wAdjustedSampleSize > ORIGINAL_SAMPLE_SIZE + ADJUSTED_SIZE)
    {
        wAdjustedSampleSize = ORIGINAL_SAMPLE_SIZE + ADJUSTED_SIZE
    }
    else if (wAdjustedSampleSize < ORIGINAL_SAMPLE_SIZE − ADJUSTED_SIZE)
    {
        wAdjustedSampleSize = ORIGINAL_SAMPLE_SIZE − ADJUSTED_SIZE
    }
    if (wAdjustedSampleSize == ORIGINAL_SAMPLE_SIZE)
    {
        For (I = 0; I < wAdjustedSampleSize; I++)
        {
```

TABLE B-continued

```
            wAdjustedAudioSamples[I] =
                wOriginalAudioSamples[I];
        }
    }
    else
    {
        for (I = 0; I < wAdjustedSampleSize; I++)
        {
            dDistance =
                (DOUBLE 1.0)*I*(ORIGINAL_SAMPLE_SIZE − 1)/(
                wAdjustedSampleSize − 1);
            wFloor = floor(dDistance);
            wCeiling = ceiling(dDistance);
            wAdjustedAudioSamples[I] =
                wOriginalAudioSamples[wFloor]*(1
                − (dDistance − wFloor)) +
                wOriginalAudioSamples[wCeiling]*
                (dDistance − wFloor);
        }
    }
    return wAdjustedSampleSize;
}
```

The algorithms included in Table B are merely exemplary, and many different algorithms may be used to reduce or increase samples of audio data.

It should be appreciated that the above-described functionality for reducing audio latency may be incorporated in program application stored in memory (e.g., random access memory (RAM), hard disk drives, floppy disks, magnetic tapes, optical discs, etc.) and executed by a processor. For example, the functionality may be provided through the streaming driver, or the like, having program instructions to perform the above-described functionality. In one embodiment, streaming driver includes program instructions for determining an amount of the audio data stored in an audio buffer and program instructions for comparing the amount with a top threshold value and a bottom threshold value. Further, program instructions are included for adjusting incrementally an audio data feed to an audio renderer such that the amount is between the top threshold value and the bottom threshold value.

In summary, the above described invention provides method and system for reducing audio latency when executing program instructions for processing audio data. Essentially, to reduce latency, streaming driver feeds audio data to an audio renderer slower than the speed at which the audio renderer can render audio data if the amount of audio data stored in the audio buffer is greater than a top threshold value. On the other hand, streaming driver may be additionally configured to feed audio data to the audio renderer faster than the speed at which the audio renderer can render audio data if the amount of audio data is less than a bottom threshold value. Thus, by keeping the amount of audio data stored in audio buffer between the top threshold value and the bottom threshold value, audio latency is reduced or altogether eliminated such that audio is synchronized with video.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for reducing audio latency when executing program instructions for processing audio data, comprising method operations of: real-time streaming of an audio data feed;
   providing a top threshold value;
   providing a bottom threshold value, the bottom threshold value defined as a function of the top threshold value;
   determining an amount of the audio data stored in an audio buffer of an audio renderer;
   comparing the amount of audio data stored in an audio buffer with the top threshold value and the bottom threshold value;
   adjusting the audio data feed to the audio renderer by modifying a the audio data feed by an incremental amount, such that the amount of the audio data stored in an audio buffer is between the top threshold value and the bottom threshold value, wherein the incremental amount is; calculated as the number of audio data samples stored in the audio buffer×(audio rendering clock frequency/audio capture clock frequency−1); and
   outputting the adjusted audio data feed to a speaker, the speaker producing sounds based on the audio data feed.

2. The method of claim 1, wherein the method operation of adjusting incrementally the audio data feed includes,
   if the amount is greater than the top threshold value, decreasing the audio data feed to the audio renderer by an incremental amount, such that the number of audio data samples provided to the audio renderer is reduced; and
   if the amount is less than the bottom threshold value, increasing the audio data feed to the audio renderer by the incremental amount, such that the number of audio data samples provided to the audio renderer is increased.

3. The method of claim 2, wherein the method operation of decreasing the audio data feed includes,
   receiving the audio data feed; and
   reducing the number of audio data samples provided to the audio renderer by the incremental amount through interpolation.

4. The method of claim 3, further comprising:
   repeating each of the method operations for subsequent audio data feeds until the amount is less than or equal to the top threshold value.

5. The method of claim 2, wherein the method operation of increasing the audio data feed includes,
   receiving the audio data feed; and
   increasing the number of received audio data samples by the incremental amount through interpolation.

6. The method of claim 5, further comprising:
   repeating each of the method operations for subsequent audio data feeds until the amount of audio data stored in the audio buffer is greater than or equal to the bottom threshold value.

7. The method of claim 1, wherein the bottom threshold value is defined by the top threshold value divided by three.

8. A computer storage medium having executable instructions for reducing audio latency when executing executable instructions for processing audio data, comprising method operations of:
   executable instructions for real-time streaming of an audio data feed;
   executable instructions for providing a top threshold value;
   executable instructions for providing a bottom threshold value, the bottom threshold value defined as a function of the top threshold value;
   executable instructions for determining an amount of audio data stored in an audio buffer of an audio renderer;
   executable instructions for comparing the amount with the top threshold value and the bottom threshold value;
   executable instructions for decreasing the audio data feed from a streaming driver to the audio renderer by modifying a number of audio data samples by a calculated incremental amount if the amount of audio data stored in an audio buffer is greater than the top threshold value; and
   executable instructions for increasing the audio data feed from the streaming driver to the audio renderer by modifying the number of audio data samples by the calculated incremental amount if the amount of audio data stored in an audio buffer is less than the bottom threshold value, wherein the calculated incremental amount is calculated as the number of audio data samples stored in the audio buffer×(audio rendering clock frequency/audio capture clock frequency−1).

9. The computer storage medium of claim 8, wherein the program instructions for decreasing the audio data feed includes, executable instructions for receiving the audio data feed;

executable instructions for reducing the number of audio data samples by the calculated incremental amount through interpolation; and executable instructions for outputting the reduced audio data feed to the audio renderer.

10. The computer storage medium of claim 8, wherein the executable instructions for increasing the audio data feed includes, executable instructions for receiving the audio data feed;

executable instructions for increasing the number of the audio data samples by the calculated incremental amount through interpolation; and executable instructions for outputting the increased audio data feed to the audio renderer.

11. The computer storage medium of claim 8, wherein the bottom threshold value is defined by the top threshold value divided by three.

12. A computer system for reducing audio latency when executing program instructions for processing audio data, comprising:

a memory configured to store a streaming driver program of an operating system;

an audio capture device configured for real-time streaming of audio data to the streaming driver program through a bus; and a processor configured to execute the streaming driver program stored in the memory, the streaming driver program including, program instructions for determining an amount of the audio data stored in an audio buffer of an audio renderer of the operating system, program instructions for comparing the amount with a top threshold value, and a bottom threshold value, the bottom threshold value defined as a function of the top threshold value, program instructions for decreasing the audio data feed to the audio renderer by modifying an audio data feed by an incremental amount such that the decreased audio data feed is slower than a rendering of the audio data by the audio renderer if the amount of the audio data stored in an audio buffer is greater than the top threshold value, wherein the incremental amount is calculated as the number of audio data samples stored in the audio buffer× (audio rendering clock frequency/audio capture clock frequency−1; and program instructions for increasing the audio data feed to the audio renderer by modifying the audio data feed by the incremental amount such that the increased audio data feed is faster than the rendering of the audio data by the audio renderer if the amount of the audio data stored in an audio buffer is less than the bottom threshold value.

13. The computer system of claim 12, wherein the program instructions for decreasing the audio data feed includes, program instructions for receiving the audio data feed;

program instructions for reducing the received audio data feed by an incremental amount through interpolation; and program instructions for outputting the reduced audio data feed to the audio renderer.

14. The computer system of claim 12, wherein the program instructions for increasing the audio data feed includes, program instructions for receiving the audio data feed;

program instructions for increasing the received audio data feed by an incremental amount through interpolation; and program instructions for outputting the increased audio data feed to the audio renderer.

* * * * *